(12) United States Patent
Unuki

(10) Patent No.: US 6,913,693 B2
(45) Date of Patent: Jul. 5, 2005

(54) IN-TANK TYPE FUEL PUMP SYSTEM

(75) Inventor: Hiroshi Unuki, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/102,941

(22) Filed: Mar. 22, 2002

(65) Prior Publication Data

US 2002/0144943 A1 Oct. 10, 2002

(30) Foreign Application Priority Data

Apr. 6, 2001 (JP) ........................................ 2001-108857

(51) Int. Cl.[7] ........................ B01D 35/027; F02M 37/22
(52) U.S. Cl. ..................... 210/416.4; 210/428; 210/460
(58) Field of Search .............................. 210/232, 416.1, 210/416.4, 418, 428, 460

(56) References Cited

U.S. PATENT DOCUMENTS

| | | | | |
|---|---|---|---|---|
| 3,575,296 A | * | 4/1971 | Peterson .................. | 210/416.4 |
| 4,617,116 A | * | 10/1986 | Seiler .......................... | 210/137 |
| 4,730,630 A | * | 3/1988 | Ranft .......................... | 134/111 |
| 4,933,093 A | * | 6/1990 | Keller ......................... | 210/774 |
| 5,579,790 A | * | 12/1996 | Edwards et al. ......... | 134/104.1 |
| 5,989,413 A | * | 11/1999 | Jauss et al. .................. | 210/109 |
| 6,358,412 B1 | * | 3/2002 | Strohl et al. ................. | 210/172 |

FOREIGN PATENT DOCUMENTS

| | | |
|---|---|---|
| JP | 02-191862 A | 7/1990 |
| JP | 11-044272 A | 2/1999 |

* cited by examiner

*Primary Examiner*—Fred G. Prince
(74) *Attorney, Agent, or Firm*—Birch, Stewart, Kolasch & Birch, LLP

(57) ABSTRACT

To provide an in-tank type fuel pump system capable of sharing a fuel filter among various mounting types of a fuel pump to a fuel tank. A fuel pump and a fuel filter are contained in a fuel tank. A discharge port of the fuel pump is connected to the fuel filter. A filter is contained in a main body of the fuel filter. A projecting portion is provided at one end of the main body, and a passage passing though the projecting portion is provided in the projecting portion. Fuel inlets are disposed at opposed ends of the passage in the direction of an axial line thereof. The discharge port is connected to either of the fuel inlets, and the other thereof is closed with a plug. A discharge passage passing through the main body is provided in the main body. Opening portions at both ends of the discharge passage in the direction of an axial line thereof are taken as fuel outlets. Either of the fuel outlets is selectively opened and the other is closed with a plug.

22 Claims, 3 Drawing Sheets

IN-TANK TYPE FUEL PUMP SYSTEM

CROSS-REFERENCE TO RELATED APPLICATIONS

The present application claims priority under 35 USC 119 to Japanese Patent Application No. 2001-108857 filed on Apr. 6, 2001.

BACKGROUND OF THE INVENTION

1. Field of the Invention

The present invention relates to an in-tank type fuel pump system including a fuel pump provided in a fuel tank for supplying fuel to an injection device. More particularly, to an in-tank type fuel pump system in which a fuel filter is connectable to a fuel pump mounted to a fuel tank in accordance with any one of various mounting manners.

2. Description of Background Art

An in-tank type fuel pump system is known, for example, as set forth in Japanese Patent Publication No. Hei 6-12100, wherein a fuel pump is mounted to a ceiling side of a fuel tank for an automobile via a stay, and a fuel filter is connected to a discharge port of the fuel pump is mounted to a ceiling portion of the fuel tank. In addition, various types of mounting for a fuel pump to be mounted to a fuel tank are known. For example, a type of mounting for a fuel pump to a fuel tank includes the fuel pump standing nearly upright on a bottom side portion of the fuel tank as shown in FIG. 2A, or a type of mounting of a fuel pump to a fuel tank in such a manner that the fuel pump is tilted from the bottom side of the fuel tank as shown in each of FIGS. 2B to 2D.

In the case of adopting the above-described various mounting types for a fuel pump to a fuel tank, each time one of the mounting types is changed to another, the position of a stay, and the positions of a fuel outlet and a fuel inlet of a fuel filter must be correspondingly changed. In other words, the same filter cannot be shared with various mounting types of a fuel pump to a fuel tank. Accordingly, it is required to prepare a new fuel filter each time one of the mounting types is changed to another. In the production field of motorcycles, in which various kinds of parts are produced in small quantities, the parts for fuel filters to be prepared become large. Thus, the management of the parts are correspondingly complicated and this results in an increase in the cost for the production. For this reason, it has been required that a fuel filter should be shared among various mounting types of a fuel pump, and to meet such a requirement, the present invention has been made.

SUMMARY AND OBJECTS OF THE INVENTION

To solve the above-described problem, according to the present invention, there is provided an in-tank type fuel pump system including a fuel pump contained in a fuel tank for supplying fuel to an injection device of an engine, and a fuel filter connected to a discharge port side of the fuel pump. The fuel pump system includes the fuel filter having a cylindrical filter main body, and a pair of fuel inlets disposed opposite to each other in the direction of an axial line of the filter main body and a pair of fuel outlets disposed opposite to each other in the direction of the axial line of the filter main body. A fuel passage is selectively determined by opening either of the pair of fuel inlets and blocking the rest thereof and also opening either of the pair of fuel outlets and blocking the rest thereof.

Since the pair of fuel inlets are provided in the fuel filter opposite to each other in the direction of the axial line of the fuel filter and similarly the pair of fuel outlets are provided in the fuel filter opposite to each other in the direction of the axial line of the fuel filter, four kinds of fuel passages can be established for one fuel filter by opening either of the fuel inlets and blocking the rest thereof and also opening either of the fuel outlets and blocking the rest thereof. As a result, various mounting types of a fuel pump to a fuel tank can be realized by using the same fuel filter by selecting a suitable one of the four kinds of fuel passages in accordance with a selected one of the mounting types. Since the fuel filter can be thus shared among various mounting types of a fuel pump to a fuel tank, it is possible to reduce the types or kinds of fuel filters, and hence to simplify management of the parts (fuel filters) and also reduce the production cost.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 2A:
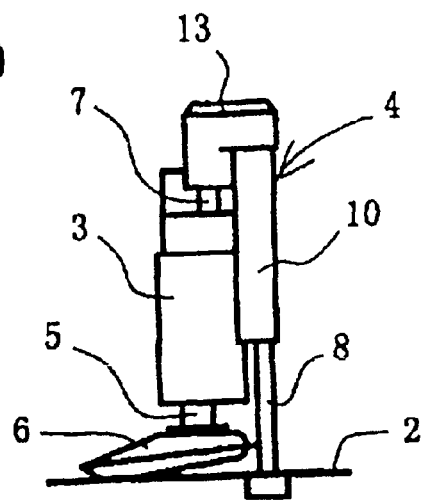
FIGS. 2A to 2D are views showing mounting types of a fuel pump system to a fuel tank according to the embodiment of the present invention.
Figure 2B:
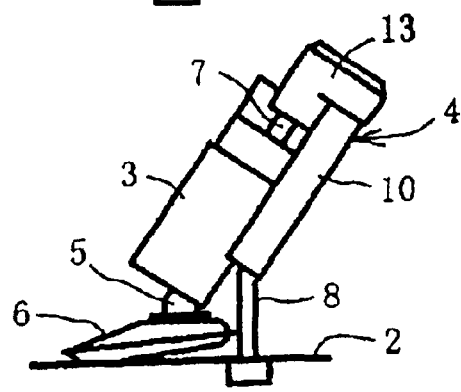
Figure 2C:
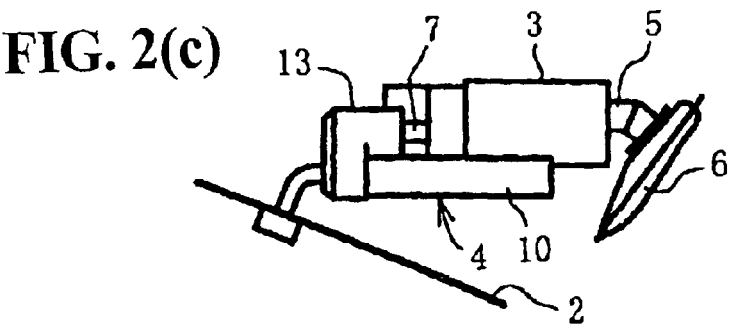
Figure 2D:
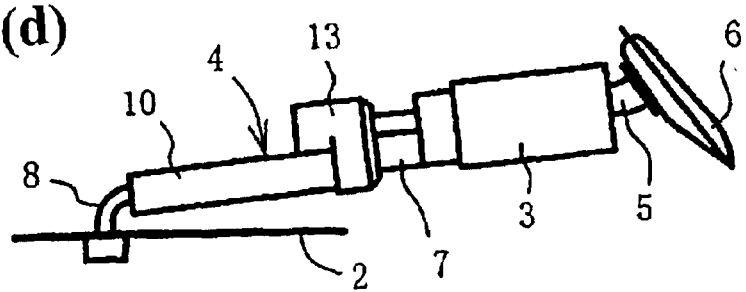
Figure 3:
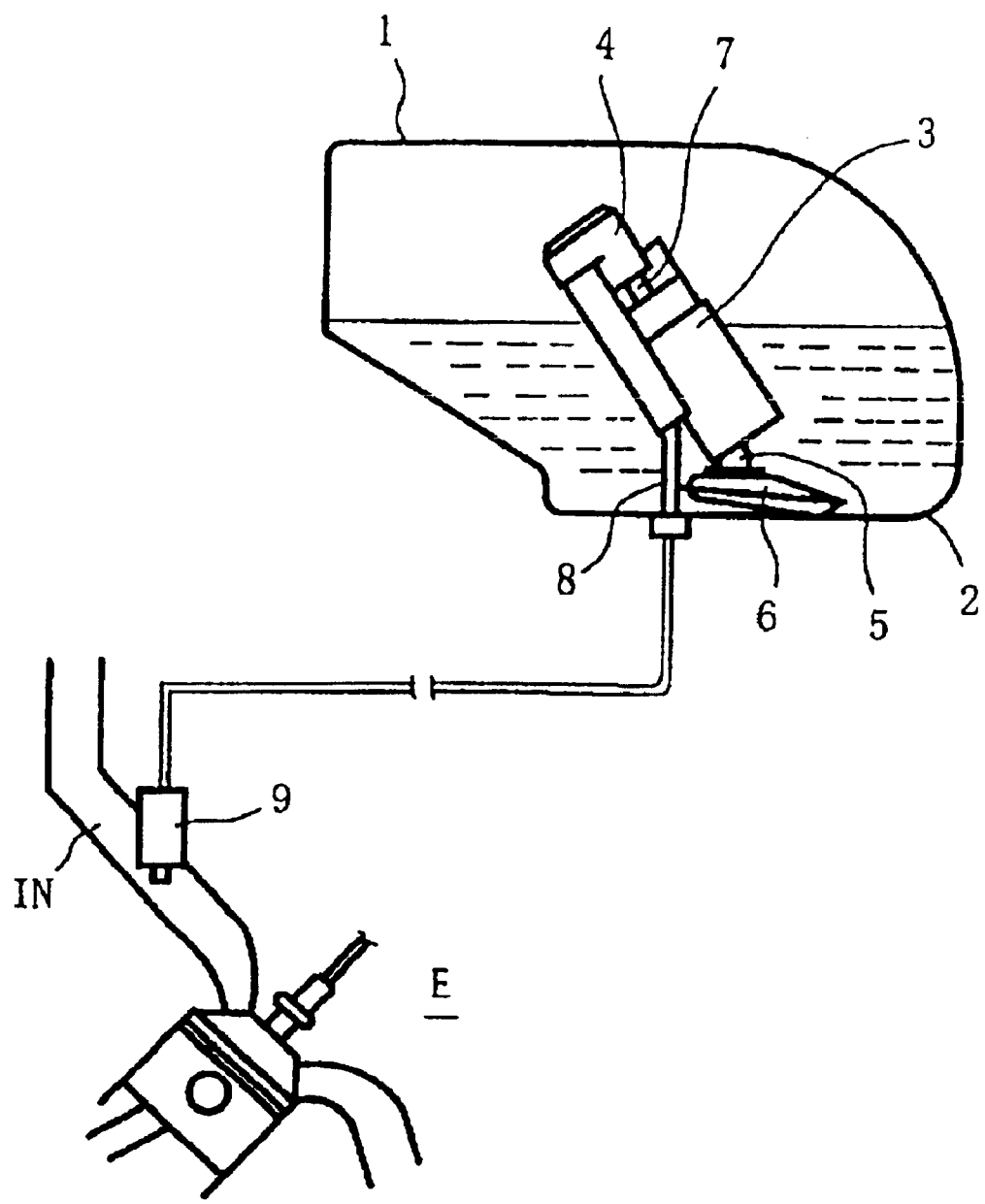
FIG. 3 is a view showing a fuel supply line of a motorcycle, to which the embodiment of the present invention is applied.

Referring first to FIG. 3, an in-tank type fuel pump system includes a fuel pump 3 and a high pressure type fuel filter 4 which are contained in a fuel tank 1 in such a manner so as to be located over a bottom portion 2. The fuel pump 3 is formed into a cylindrical shape containing a motor. One end side of the cylindrical fuel pump 3 in an axial direction thereof is taken as a suction portion 5. Fuel is sucked from the suction portion 5 through a strainer 6 (see FIGS. 2A to 2D) connected to the suction portion 5. A discharge port 7 is formed on the other end side of the cylindrical fuel pump 3 in the axial direction in such a manner as to project therefrom. The discharge port 7 is directly connected to the fuel filter 4.

The fuel pump 3 and the fuel filter 4, which are integrated with each other, are disposed while being tilted from the bottom portion 2, and mounted to the bottom portion 2 by means of a stay 8. The stay 8 is formed into a pipe-like shape whose interior is taken as a discharge passage of fuel. That is to say, the stay 8 serves as a high pressure piping line. Fuel, which passes through the stay 8, is supplied to an injection valve 9 of an engine E. The injection valve 9 is inserted in an intake passage IN of the engine E, and is used to inject fuel to a combustion chamber.

Figure 1:
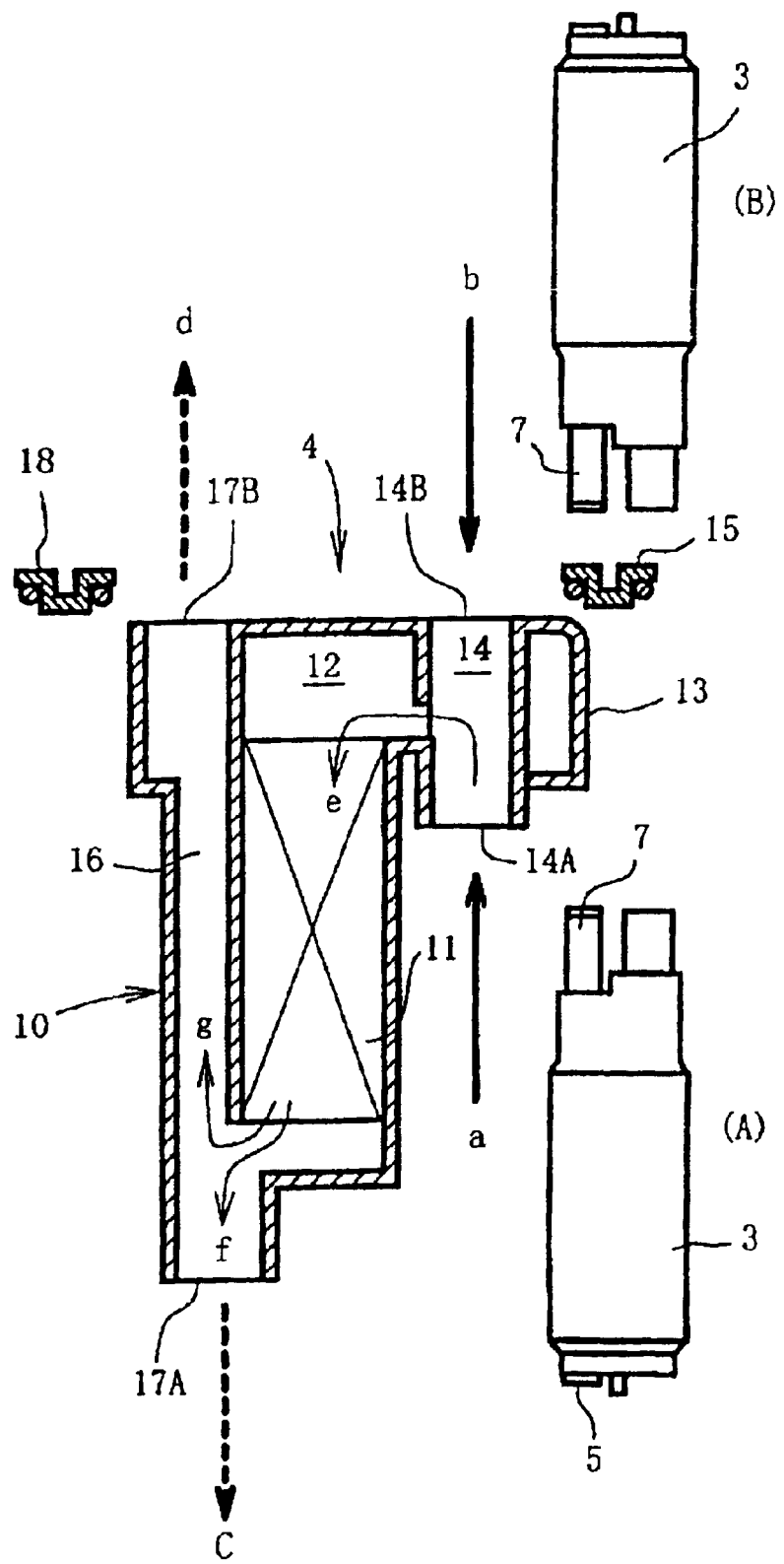
FIG. 1 is a view illustrating a method of use of a fuel filter according to an embodiment of the present invention.

FIG. 1 shows a method of assembling the fuel pump 3 with a fuel filter 4. As shown in FIG. 1, the fuel pump 3 can be placed in either an erect posture A in which a suction portion 5 is directed downwardly and a discharge port 7 is directed upwardly, or an inverted posture B in which the suction portion 5 is directed upwardly and the discharge port 7 is directed downwardly.

The fuel filter 4 is formed by a suitable method using a suitable material, for example, by injection molding of a resin. The fuel filter 4 includes a cylindrical main body 10 that is longer than the fuel pump 3. A filter 11 is contained in the main body 10, and one side of the filter 11 is connected to a fuel inlet passage 12. Assume that A is the erected posture, B is the inverted posture.

One end portion in the axial direction, in which the fuel inlet passage 12 is provided, of the main body 10 has a projecting portion 13 which projects sideways therefrom. A through-hole 14, which extends in parallel to an axial line of the main body 10 and which is communicated to the fuel inlet passage 12, is formed in the projecting portion 13. Opening portions at both ends of the through-hole 13 are taken as a fuel inlet 14A and a fuel inlet 14B, which are disposed opposite to each other in the direction of the axial line of the main body 10.

The discharge port 7 of the fuel pump 3 is placed in the erected posture A and is fittable in the fuel inlet 14A. The discharge port 7 of the fuel pump 3 in the inverted posture B is fittable in the fuel inlet 14B. In each case, by fitting the discharge port 7 of the fuel pump 3 in the fuel inlet 14A or 14B, the fuel pump 3 and the fuel filter 4 are integrated with each other with their axial lines extending in parallel to each other. At this time, the fuel inlet 14A or 14B to which the discharge port 7 is not connected is closed with a plug 15.

The main body 10 has a discharge passage 16 which passes through the main body 10 in the axial direction thereof. Opening portions at both ends of the discharge passage 16 are taken as a fuel outlet 17A and a fuel outlet 17B. The fuel outlets 17A and 17B are disposed opposite to each other in the direction of the axial line of the main body 10. Either of the fuel outlets 17A and 17B is opened and the other thereof is closed with a plug 18. The main body 10 is thus a multi-function part serving as a portion for containing the filter 11, a high pressure piping line portion including the discharge passage 16, and a case for mounting the fuel pump 3.

A function of this embodiment will be described below. If the fuel pump 3 is placed in the erect posture A, then the following two flow paths of fuel are established. In this case, as shown in FIG. 1, the discharge port 7 is connected to the fuel inlet 14A and the fuel inlet 14B is closed with the plug 15. In such a state, two flow paths along which fuel is discharged through the discharge passage 16 are selectable. One flow path is established by opening the fuel outlet 17A and closing the fuel outlet 17B, and the other flow path is established by opening the fuel outlet 17B and closing the fuel outlet 17A.

If the fuel outlet 17A is opened and the fuel outlet 17B is closed with the plug 18, then fuel in the fuel filter 4 flows along a flow path of the fuel inlet 14A-filter 11-fuel outlet 17A, which path is shown by arrows a-e-f-c in FIG. 1 (pattern 1). If the fuel outlet 17A is closed and the fuel outlet 17B is opened, fuel in the fuel filter 4 flows along a flow path of the fuel inlet 14A-filter 11-fuel outlet 17B, which path is shown by arrows a-e-g-d in FIG. 1 (pattern 2).

On the other hand, if the fuel pump 3 is placed in the inverted posture B, then the following two flow paths of fuel are established. In this case, as shown in FIG. 1, the discharge port 7 of the fuel pump 3 is connected to the fuel inlet 14B and the fuel port 14A is closed with the plug 15. Consequently, fuel in the fuel filter 4 flows along a flow path of the fuel inlet 14B-filter 11-fuel outlet 17A, which path is shown by arrows b-e-f-c in the figure (pattern 3). Alternatively, fuel in the fuel filter 4 flows in a flow path of the fuel inlet 14B-filter 11-fuel outlet 17B, which path is shown by arrows b-e-g-d (pattern 4).

Accordingly, the four kinds of flow paths of fuel in total can be established by using the same fuel filter 4.

FIGS. 2A to 2D are views showing mounting states of the fuel pump 3 to the fuel tank 1, which mounting states are determined depending on the above-described flow paths of fuel, wherein FIG. 2A shows a mounting state that the fuel pump 3 stands upright on the bottom portion 2 of the fuel tank 1, and each of FIGS. 2B to 2D shows a mounting state wherein the fuel pump 3 is tilted from the bottom portion 2 of the fuel tank 1. To be more specific, in the mounting state shown in FIG. 2A, the pattern 1 is adopted as the flow path of fuel, and the fuel pump 3 stands upright with its axial line directed in the vertical direction.

In the mounting state shown in FIG. 2B, the pattern 1 is adopted as the fuel path of fuel, and the axial line of the fuel pump 3 is tilted and the stay 8 is mounted to the bottom portion 2 while being bent in an approximately V-shape with respect to the main body 10.

In the mounting state shown in FIG. 2C, the pattern 2 is adopted as the flow path of fuel, and both the axial lines of the fuel pump 3 and the fuel filter 4 are kept substantially in the horizontal direction and the stay 8 is curvedly mounted to the tilted bottom portion 2. This mounting type is suitable for the case in which the bottom portion 2 is tilted.

In the mounting state shown in FIG. 2D, the pattern 3 is adopted as the fuel path of fuel, and the axial lines of the fuel pump 3 and the fuel filter 4 are slightly tilted from the bottom portion 2 and the curved stay 8 is mounted to the bottom portion 2 and kept substantially in the horizontal direction. This mounting type makes the total length of the fuel pump 3 and the fuel filter 4 the longest. Therefore, it is suitable for the case where the vertical dimension of the fuel tank 1 is not large so much and the horizontal dimension is large.

It is to be noted that the example adopting the pattern 4 is not shown in FIGS. 2A to 2D; however, the mounting type adopting the pattern 3 can be of course adopted in accordance with the examples shown in FIGS. 2A to 2D. In addition, the stay 8 can be mounted not only to the bottom portion 2 of the fuel tank 1 but also to a side portion or a ceiling portion of the fuel tank 1. In particular, in the case of mounting the stay 8 to the ceiling portion of the fuel tank 1, each of the patterns 2 and 4, in which fuel is discharged in the upward direction, is effectively adopted.

According to this embodiment, since various mounting types of the fuel pump 3 to the fuel tank 1 can be realized by changing the connection position of the fuel pump 3, changing the mounting positions of the plugs 15 and 18, and changing the shape of the stay 8 into a suitable one, the fuel filter 4 can be shared among the various mounting types. In other words, it is not required to newly prepare the fuel filter 4 each time one of the mounting types of the fuel pump to the fuel tank is changed to another. Accordingly, it is possible to reduce the types or kinds of the fuel filters 4, and hence to simplify the management of the parts (fuel filters) and reduce the production cost.

According to this embodiment, since the fuel pump 3 is directly connected to the fuel filter 4 and the stay 8 serves as a high pressure piping line, it is possible to eliminate the need for the provision of a separate high pressure piping line in the fuel tank, differently from the related art fuel pump system, and hence to reduce the number of parts and the weight, and further reduce the production cost.

It is to be noted that the present invention is not limited to the above-described embodiment but may be variously changed without departing from the scope of the present invention. For example, the plugs 15 and 18 are not necessarily provided separately from the main body of the fuel filter 4 but may be provided integrally therewith by molding the plugs 15 and 18 integrally with the main body, which is made from a resin, of the fuel filter 4 at the time of injection molding of the main body of the fuel filter 4. Further, the fuel tank used for the present invention is not limited to a fuel tank for a motorcycle but may be a fuel tank for another vehicle such as an automobile.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An in-tank type fuel pump system including a fuel pump contained in a fuel tank for supplying fuel to an injection device of an engine, and a fuel filter connected to a discharge port side of said fuel pump comprising:
    said fuel filter includes a cylindrical filter main body, and a pair of fuel inlets disposed opposite to each other in the direction of an axial line of said filter main body and a pair of fuel outlets disposed opposite to each other in the direction of the axial line of said filter main body;
    wherein a fuel passage is selectively determined by opening either of said pair of fuel inlets and blocking the rest thereof and also opening either of said pair of fuel outlets and blocking the rest thereof.

2. The in-tank type fuel pump system including a fuel pump according to claim 1, wherein a fuel passageway is provided between a first fuel inlet, the filter main body and a first fuel outlet.

3. The in-tank type fuel pump system including a fuel pump according to claim 1, wherein a fuel passageway is provided between a second fuel inlet, the filter main body and a second fuel outlet.

4. The in-tank type fuel pump system including a fuel pump according to claim 2, wherein a second fuel inlet and a second fuel outlet are closed to complete said fuel passageway.

5. The in-tank type fuel pump system including a fuel pump according to claim 3, wherein a first fuel inlet and a second fuel outlet are closed to complete said fuel passageway.

6. The in-tank type fuel pump system including a fuel pump according to claim 1, wherein the discharge port side of said fuel pump may be connected to either of said fuel outlets.

7. An in-tank fuel pump system including a fuel pump contained in a fuel tank for supplying fuel to an engine comprising:
    a main body;
    a first inlet opening being in communication with said main body;
    a second inlet opening being in communication with said main body;
    a filter passageway adapted for positioning a filter;
    a first outlet opening being in communication with said main body; and
    a second outlet opening being in communication with said main body;
    wherein a fuel passage is selectively determined by opening the first inlet and closing the second inlet and opening the first outlet and closing the second outlet.

8. The in-tank fuel pump system including a fuel pump according to claim 7, wherein the passage is provided between the first inlet, the filter passageway and the first outlet.

9. The in-tank fuel pump system including a fuel pump according to claim 7, wherein the filter passageway is centrally disposed in said main body with the first and second inlets being positioned on a first side thereof and said first and second outlets being positioned on a second side thereof.

10. The in-tank fuel pump system including a fuel pump according to claim 7, and further including a plug for closing said second inlet and said second outlet.

11. An in-tank fuel pump system including a fuel pump contained in a fuel tank for supplying fuel to an engine comprising:
    a main body;
    a first inlet opening being in communication with said main body;
    a second inlet opening being in communication with said main body;
    a filter passageway adapted for positioning a filter;
    a first outlet opening being in communication with said main body; and
    a second outlet opening being in communication with said main body;
    wherein a fuel passage is selectively determined by opening the second inlet and closing the first inlet and opening the second outlet and closing the first outlet.

12. The in-tank fuel pump system including a fuel pump according to claim 11, wherein the passage is provided between the second inlet, the filter passageway and the second outlet.

13. The in-tank fuel pump system including a fuel pump according to claim 11, wherein the filter passageway is centrally disposed in said main body with the first and second inlets being positioned on a first side thereof and said first and second outlets being positioned on a second side thereof.

14. The in-tank fuel pump system including a fuel pump according to claim 11, and further including a plug for closing said second inlet and said second outlet.

15. An in-tank fuel puma system including a fuel pump contained in a fuel tank for supplying fuel to an engine comprising:
    a main body;
    a first inlet opening being in communication with said main body;
    a second inlet opening being in communication with said main body;
    a filter passageway adapted for positioning a filter;
    a first outlet opening being in communication with said main body; and
    a second outlet opening being in communication with said main body;
    wherein a fuel passage is selectively determined by opening the first inlet and closing the second inlet and opening the second outlet and closing the first outlet.

16. The in-tank fuel pump system including a fuel pump according to claim 15, wherein the passage is provided between the first inlet, the filter passageway and the second outlet.

17. The in-tank fuel pump system including a fuel pump according to claim 15, wherein the filter passageway is centrally disposed in said main body with the first and second inlets being positioned on a first side thereof and said first and second outlets being positioned on a second side thereof.

18. The in-tank fuel pump system including a fuel pump according to claim 15, and further including a plug for closing said second inlet and said first outlet.

19. An in-tank fuel pump system including a fuel pump contained in a fuel tank for supplying fuel to an engine comprising:

a main body;

a first inlet opening being in communication with raid main body;

a second inlet opening being in communication with said main body;

a filter passageway adapted for positioning a filter;

a first outlet opening being in communication with said main body; and a second outlet opening being in communication with said main body;

wherein a fuel passage is selectively determined by opening the second inlet and closing the first inlet and opening the first outlet and closing the second outlet.

20. The in-tank fuel pump system including a fuel pump according to claim 19, wherein the passage is provided between the second inlet, the filter passageway and the first outlet.

21. The in-tank fuel pump system including a fuel pump according to claim 19, wherein the filter passageway is centrally disposed in said main body with the first and second inlets being positioned on a first side thereof and said first and second outlets being positioned on a second side thereof.

22. The in-tank fuel pump system including a fuel pump according to claim 19, and further including a plug for closing said second inlet and said second outlet.

* * * * *